US011932259B2

(12) United States Patent
Kiriki et al.

(10) Patent No.: US 11,932,259 B2
(45) Date of Patent: Mar. 19, 2024

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Jumpei Kiriki, Tokyo-to (JP); Taiyo Uejima, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 17/532,659

(22) Filed: Nov. 22, 2021

(65) Prior Publication Data

US 2022/0234597 A1 Jul. 28, 2022

(30) Foreign Application Priority Data

Jan. 22, 2021 (JP) .................................. 2021-008735

(51) Int. Cl.
*B60W 30/18* (2012.01)
*B60W 40/09* (2012.01)
(Continued)

(52) U.S. Cl.
CPC .... *B60W 40/105* (2013.01); *B60W 30/18109* (2013.01); *B60W 40/09* (2013.01); *B60W 2040/0818* (2013.01)

(58) Field of Classification Search
CPC .......... B60K 28/06; B60W 2040/0818; B60W 2050/143; B60W 2540/221;
(Continued)

(56) References Cited

U.S. PATENT DOCUMENTS

2013/0138319 A1* 5/2013 Schuberth .......... B60K 31/0066
701/93
2017/0297569 A1* 10/2017 Nilsson .................. G08G 1/205
(Continued)

FOREIGN PATENT DOCUMENTS

JP H09249104 A 9/1997
JP 3401855 B2 4/2003
(Continued)

*Primary Examiner* — Jaime Figueroa
*Assistant Examiner* — Zachary Joseph Wallace
(74) *Attorney, Agent, or Firm* — Dickinson Wright, PLLC

(57) ABSTRACT

A vehicle control device has a processor that is configured to determine the level of active operation by the driver, to determine the relationship between the speed of the vehicle and a predetermined reference speed, and to generate a first driving plan whereby a first deceleration is used to decelerate the vehicle without activating the brake light, when it has been determined that the level of active operation by the driver is lower than the predetermined reference level and the speed of the vehicle is faster than the reference speed, and to generate a second driving plan whereby a second deceleration that is greater than the first deceleration is used to decelerate the vehicle when it has been determined that the level of active operation by the driver is lower than the predetermined reference level and the speed of the vehicle is equal to or below the reference speed.

4 Claims, 6 Drawing Sheets

(51) Int. Cl.
*B60W 40/105* (2012.01)
*B60W 40/08* (2012.01)

(58) Field of Classification Search
CPC ....... B60W 2540/229; B60W 2520/10; B60W 2556/50; B60W 2720/106; B60W 30/18109; B60W 40/105; B60W 40/09; B60W 50/14; B60W 60/001; B60Y 2302/05

See application file for complete search history.

(56) References Cited

U.S. PATENT DOCUMENTS

| | | | |
|---|---|---|---|
| 2018/0037214 A1 | 2/2018 | Otake et al. | |
| 2019/0210516 A1* | 7/2019 | Sata | G08G 1/096775 |
| 2020/0180661 A1* | 6/2020 | Honda | B60W 60/0054 |
| 2021/0370780 A1* | 12/2021 | Cho | B60L 15/2009 |
| 2022/0072962 A1* | 3/2022 | Maury | B60L 58/12 |

FOREIGN PATENT DOCUMENTS

| | | | |
|---|---|---|---|
| JP | 3433642 B2 | 8/2003 | |
| JP | 2008037218 A | 2/2008 | |
| JP | 4400236 B2 | 1/2010 | |
| JP | 2018020692 A | 2/2018 | |
| JP | 2019123327 A | 7/2019 | |

* cited by examiner

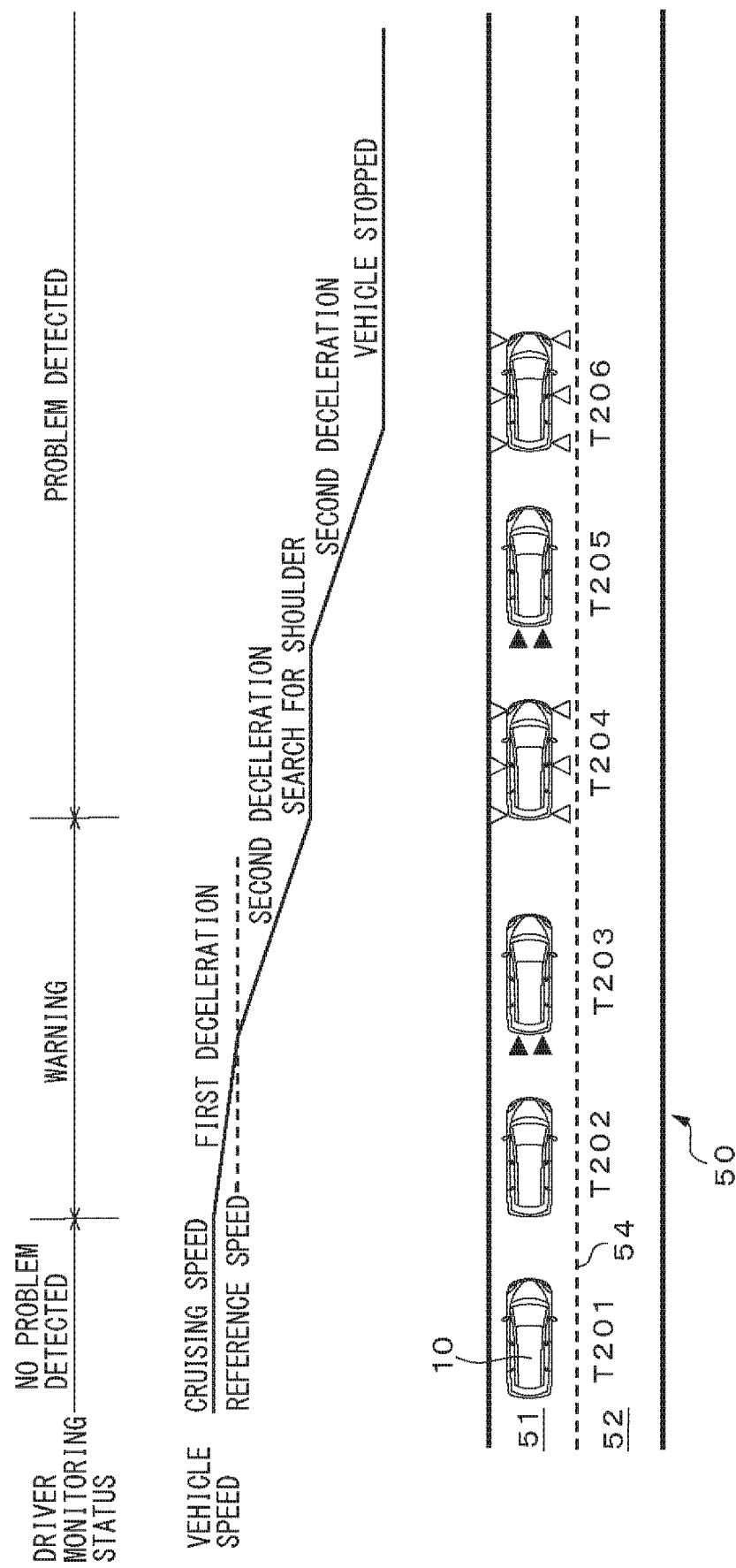

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present invention relates to a vehicle control device, to a storage medium that stores a computer program for vehicle control, and to a method for controlling a vehicle.

BACKGROUND

An automatic control device mounted in a vehicle creates a navigation route for the vehicle based on the current location of the vehicle, the destination location of the vehicle, and map information, and controls the vehicle so that it travels along the navigation route.

The automatic control device controls operation of the vehicle so that a safe distance is maintained between the vehicle and other vehicles. When it has been determined that a safe distance cannot be maintained between the vehicle and another vehicle by automatic control, the automatic control device switches operation of the vehicle from automatic control to manual control, transferring control of the vehicle to the driver.

When there is a problem with the driver, the automatic control device controls the vehicle so that it stops on the traveling lane in which it is traveling. It is not possible to transfer of control of the vehicle to the driver when the automatic control device has determined that safe traveling is not possible.

Japanese Unexamined Patent Publication No. H9-249104, for example, proposes an automatic braking device for a vehicle that immediately flashes a brake lamp during an automatic brake notice time period when the alertness level of the driver has fallen below the alertness level at the start of braking, and then begins a braking operation to generate braking force.

SUMMARY

With the automatic braking device for a vehicle described in Japanese Unexamined Patent Publication No. H9-249104, since the brake light is immediately activated and the brake is operated if the driving alertness level of the driver falls below the alertness level at the start of braking even when the vehicle is traveling at a relatively high speed, this has potentially caused drivers of subsequent vehicles to become startled, thus interfering with traffic.

It is therefore an object of the present invention to provide a vehicle control device that can immediately control the speed of the vehicle without activating a brake light so as to avoid interfering with traveling of subsequent vehicles when it has been determined that the level of active operation by the driver is low and the vehicle is traveling at a relatively high speed.

One embodiment of the invention provides a vehicle control device. The vehicle control device has a driver determination unit that determines the level of active operation by the driver, a speed determination unit that determines the relationship between the speed of the vehicle and a predetermined reference speed, and a drive planning unit that generates a first driving plan whereby a first deceleration is used to decelerate the vehicle without activating the brake light when it has been determined that the level of active operation by the driver is lower than the predetermined reference level and the speed of the vehicle is faster than the reference speed, and generates a second driving plan whereby a second deceleration that is greater than the first deceleration is used to decelerate the vehicle when it has been determined that the level of active operation by the driver is lower than the predetermined reference level and the speed of the vehicle is equal to or below the reference speed.

The vehicle control device further has a vehicle control unit that controls operation of the vehicle based on the first driving plan, wherein the vehicle control unit controls the vehicle so that the vehicle is accelerated so that deceleration of the vehicle reaches the first deceleration when deceleration of the vehicle controlled based on the first driving plan is greater than the first deceleration.

The drive planning unit in the vehicle control device preferably also generates the second driving plan so that the vehicle is moved to the shoulder adjacent to the traveling lane in which the vehicle is traveling and stopped after the vehicle has been moved to the shoulder.

The drive planning unit of the vehicle control device also preferably generates a second driving plan so that an emergency flash indicator flashes when it has been determined that the level of active operation by the driver is lower than a second predetermined reference level which is lower than the predetermined reference level and the speed of the vehicle is equal to or below the reference speed, and the brake light activates and the emergency flash indicator turns off when it has been determined that the level of active operation by the driver is lower than the second predetermined reference level and a braking device is being used.

According to another embodiment, a non-transitory storage medium is provided which stores a computer program for vehicle control. The computer program for vehicle control causes a processor to determine the level of active operation by the driver, determine the relationship between the speed of the vehicle and a predetermined reference speed, and, generate a first driving plan whereby a first deceleration is used to decelerate the vehicle without activating a brake light when it has been determined that the level of active operation by the driver is lower than the predetermined reference level and the speed of the vehicle is faster than the reference speed, and generate a second driving plan whereby a second deceleration that is greater than the first deceleration is used to decelerate the vehicle when it has been determined that the level of active operation by the driver is lower than the predetermined reference level and the speed of the vehicle is equal to or below the reference speed.

Another embodiment of the invention provides a method for controlling a vehicle. In the method for controlling a vehicle, the vehicle control device determines the level of active operation by the driver, determines the relationship between the speed of the vehicle and a predetermined reference speed and, generates a first driving plan whereby a first deceleration is used to decelerate the vehicle without activating a brake light when it has been determined that the level of active operation by the driver is lower than the predetermined reference level and the speed of the vehicle is faster than the reference speed, and generates a second driving plan whereby a second deceleration that is greater than the first deceleration is used to decelerate the vehicle when it has been determined that the level of active operation by the driver is lower than the predetermined reference level and the speed of the vehicle is equal to or below the reference speed.

With the vehicle control device of the invention, when it has been determined that the level of active operation by the driver is low and the vehicle is traveling at a relatively high speed, the vehicle can be decelerated without activating the brake light until the speed of the vehicle has fallen below the predetermined reference speed, so as to avoid interfering with traveling of subsequent vehicles.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a diagram illustrating operation of a vehicle control system (3).

DESCRIPTION OF EMBODIMENTS

Figure 1:
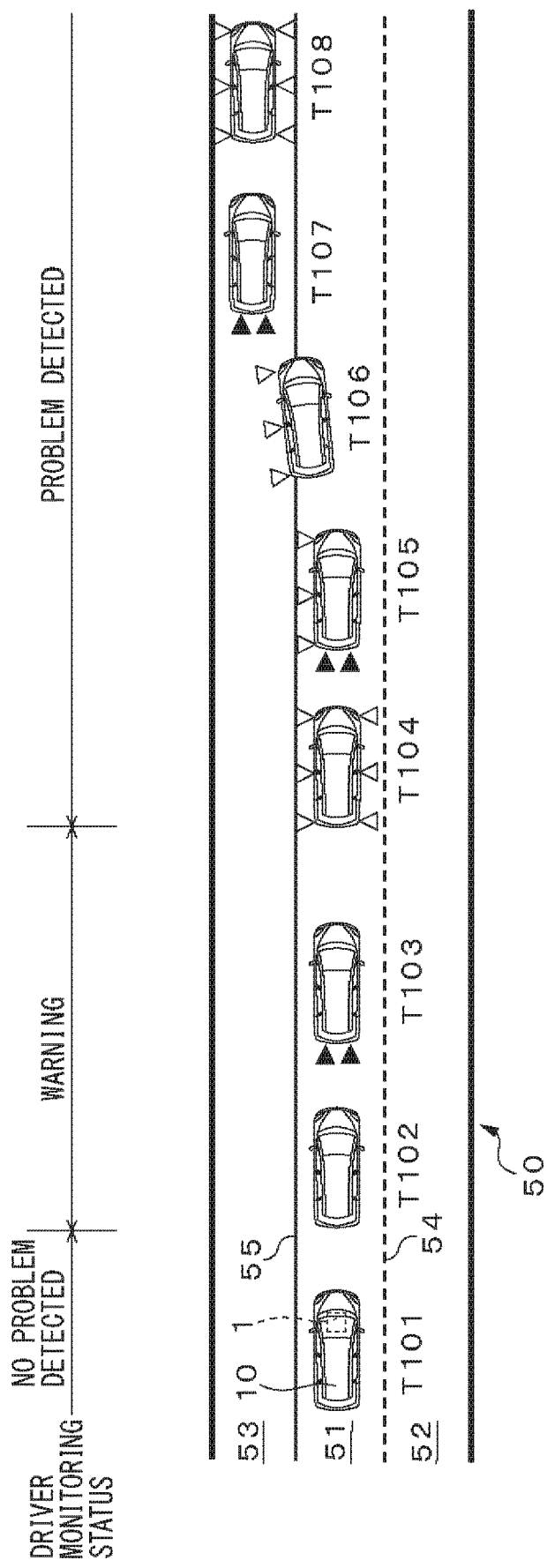
FIG. 1 is a diagram illustrating in overview the operation of a vehicle control system as an example of a vehicle control device of the embodiment.

FIG. 1 is a diagram illustrating in overview the operation of a vehicle control system 1 as an example of a vehicle control device of the embodiment. Operation relating to deceleration plan processing by the vehicle control system 1 disclosed herein will now be described in overview with reference to FIG. 1.

In the example shown in FIG. 1, a vehicle 10 travels on a traffic lane 51 of a road 50 having two traffic lanes 51, 52 and a shoulder 53. The traffic lanes 51 and 52 are divided by a lane marking line 54, and the traffic lane 51 and shoulder 53 are divided by a lane marking line 55.

The vehicle control system 1 installed in the vehicle 10 automatically controls driving of the vehicle 10. The vehicle control system 1 monitors the level of active operation by the driver, in order to determine whether or not control of the vehicle can be transferred to the driver when operation of the vehicle 10 can no longer be automatically controlled.

At time T101, the vehicle 10 is traveling on the traffic lane 51, and the vehicle control system 1 determines that the level of active operation by the driver is equal to or above the predetermined reference level.

At time T102, the vehicle control system 1 determines that the level of active operation by the driver is lower than the predetermined reference level, and warns the driver that they should be active in driving. Since the speed of the vehicle 10 is faster than the reference speed, the vehicle control system 1 also controls operation of the vehicle 10 so that a first deceleration whereby the vehicle 10 is decelerated to a level that does not interfere with traveling of subsequent vehicles, is used to decelerate the vehicle 10 without activating the brake light.

At time T103, the level of active operation by the driver continues to be lower than the predetermined reference level and the speed of the vehicle 10 has reached equal to or below the reference speed, and therefore the vehicle control system 1 controls the operation of the vehicle 10 so that a second deceleration that is greater than the first deceleration is used to decelerate the vehicle 10. As a result, the vehicle 10 uses the braking device for further deceleration while activating the brake light.

At time T104, the level of active operation by the driver continues to be low even after a predetermined time has elapsed after the warning has been given to the driver. The vehicle control system 1 determines that there is a problem with the driver, and generates a driving plan to move the vehicle 10 to the shoulder 53 and stop it. The vehicle 10 therefore moves from the traffic lane 51 to the shoulder 53 and stops on the shoulder at time T108.

The vehicle control system 1 is thus designed so that, when it has been determined that the level of active operation by the driver is low and the vehicle 10 is traveling at a relatively high speed, it can cause the vehicle 10 to decelerate without activating the brake light until the speed of the vehicle 10 has fallen below the predetermined reference speed, so as to avoid interfering with traveling of subsequent vehicles.

Figure 2:
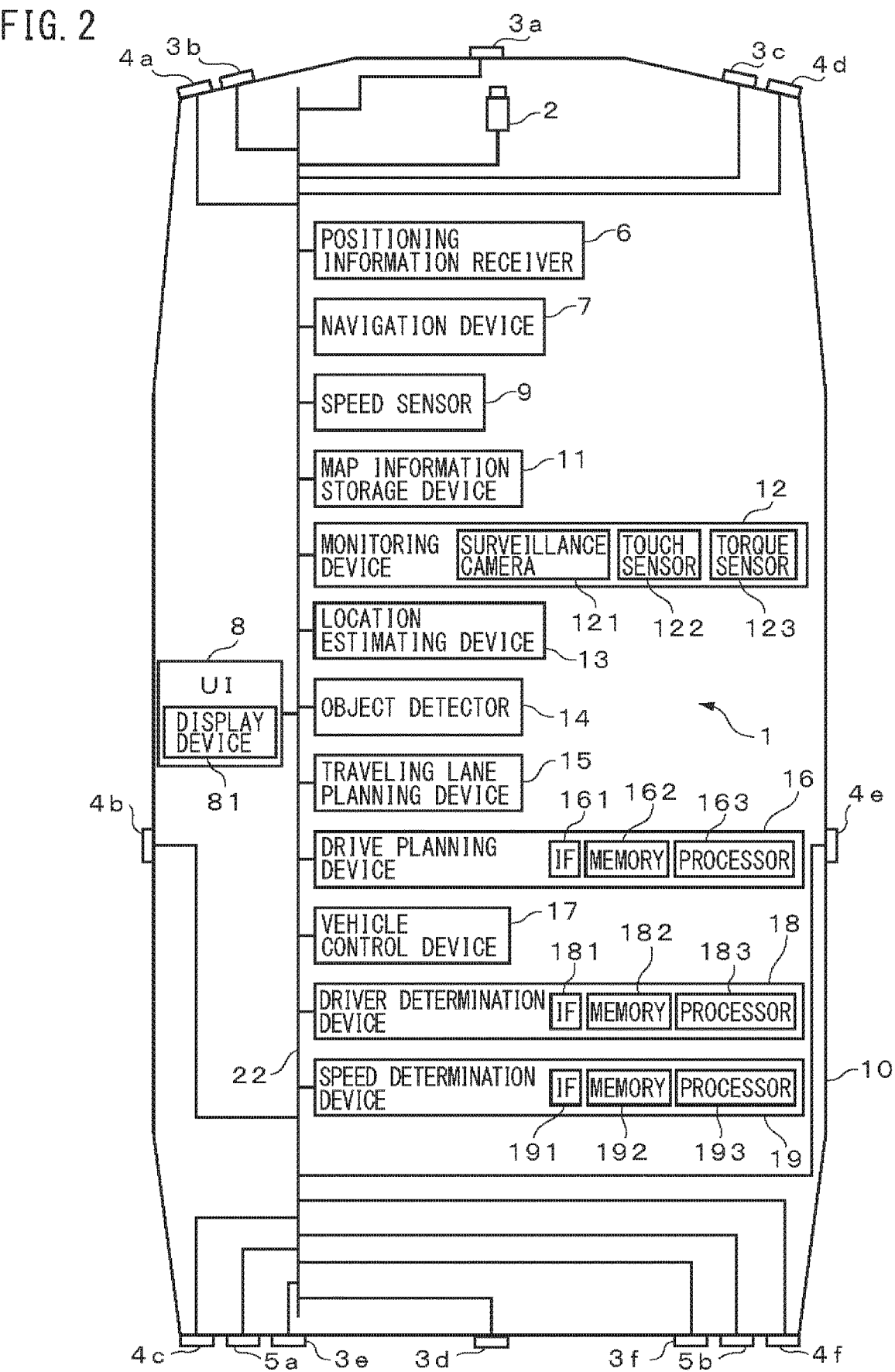
FIG. 2 is a general schematic drawing of a vehicle in which a vehicle control system of the embodiment is mounted.

FIG. 2 is a general schematic drawing of a vehicle 10 in which the vehicle control system 1 is installed. The vehicle 10 comprises a camera 2, radar sensors 3a to 3f, emergency flashing lights (turn signals) 4a to 4f, brake lights 5a, 5b, a positioning information receiver 6, a navigation device 7, a user interface (UI) 8, a speed sensor 9, a map information storage device 11, a monitoring device 12, a location estimating device 13, an object detector 14, a traveling lane planning device 15, a drive planning device 16, a vehicle control device 17, a driver determination device 18 and a speed determination device 19. The map information storage device 11, monitoring device 12, location estimating device 13, object detector 14, traveling lane planning device 15, drive planning device 16, vehicle control device 17, driver determination device 18 and speed determination device 19 constitute the vehicle control system 1. The vehicle 10 may also have a LiDAR sensor to detect road features or other objects.

The drive planning device 16, driver determination device 18 and speed determination device 19 cooperate to generate a driving plan whereby, when it has been determined that the level of active operation by the driver is lower than the predetermined reference level, and the vehicle 10 is traveling at a relatively high speed, the speed of the vehicle 10 is caused to decelerate so as not to interfere with traveling of subsequent vehicles.

The camera 2, radar sensors 3a to 3f, emergency flashing lights (turn signals) 4a to 4f, brake lights 5a, 5b, positioning information receiver 6, navigation device 7, user interface (UI) 8, speed sensor 9, map information storage device 11, monitoring device 12, location estimating device 13, object detector 14, traveling lane planning device 15, drive planning device 16, vehicle control device 17, driver determination device 18 and speed determination device 19 are connected in a communicable manner through an in-vehicle network 22 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 22 to the location estimating device 13 and object detector 14. The camera image is also used for processing at the location estimating device 13 to estimate the location of the vehicle 10. At the object detector 14, the camera image is used for processing to detect other objects surrounding the vehicle 10.

The radar sensors 3a to 3f are mounted on the outer sides of the vehicle 10, for example, being directed toward the front, left front, right front, rear, left rear and right rear of the vehicle 10, respectively. The radar sensors 3a to 3f respectively synchronize and emit millimeter waves toward the front, left front, right front, rear, left rear and right rear of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the millimeter waves have been emitted. Each of the radar sensors 3a to 3f outputs the reflected wave information that includes the millimeter wave emission direction and the time required for the reflected wave to return, together with the reflected wave information acquisition time at which the millimeter waves were emitted, through the in-vehicle network 22 to the object detector 14. At the object detector 14, the reflected wave information is used for processing to detect other objects surrounding the vehicle 10.

The emergency flashing lights (turn signals) 4a to 4f are mounted on the outer sides of the vehicle 10, and are directed toward the left front, left, left rear, right front, right and right rear of the vehicle 10. The emergency flashing lights (turn signals) 4a to 4f are controlled by the vehicle control system 1. When the vehicle 10 is in a state of emergency, all of the emergency flashing lights 4a to 4f are activated. When the vehicle 10 is to change direction toward the left, the turn signals 4a to 4c are activated, and when the vehicle 10 is to change direction toward the right, the turn signals 4d to 4f are activated.

The brake lights 5a, 5b are mounted on the outer side of the vehicle 10, for example, and directed toward the left rear and right rear of the vehicle 10. The brake lights 5a, 5b are controlled by the vehicle control system 1. The brake lights 5a, 5b are activated when the braking device (not shown) of the vehicle 10 is being operated, notifying subsequent vehicles that the braking device is activated for deceleration.

The positioning information receiver 6 outputs positioning information that represents the current location of the vehicle 10. The positioning information receiver 6 may be a GNSS receiver, for example. The positioning information receiver 6 outputs positioning information and the positioning information acquisition time at which the positioning information has been acquired, to the navigation device 7 and map information storage device 11, each time positioning information is acquired at a predetermined receiving cycle.

Based on the navigation map information, the destination location of the vehicle 10 input through the UI 8, and positioning information representing the current location of the vehicle 10 input from the positioning information receiver 6, the navigation device 7 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 7 creates a new navigation route for the vehicle 10. Every time a navigation route is created, the navigation device 7 outputs the navigation route to the location estimating device 13, the traveling lane planning device 15 and the drive planning device 16, via the in-vehicle network 22.

The UI 8 is an example of a notification unit. The UI 8 is controlled by the navigation device 7, monitoring device 12 and drive planning device 16 to give the driver traveling information for the vehicle 10 and a warning for recommending active driving. The UI 8 also creates an operation signal in response to operation of the vehicle 10 by the driver. The traveling information of the vehicle 10 includes information relating to the current location of the vehicle and the current and future route of the vehicle, such as the navigation route. The UI 8 has a display device 81 such as a liquid crystal display or touch panel, for display of the traveling information and warnings. The UI 8 may also have an acoustic output device (not shown) to notify the driver of traveling information and warnings. The UI 8 also has a touch panel or operating button, for example, as an input device for inputting operation information from the driver to the vehicle 10. The operation information may be, for example, a destination location, transit points, vehicle speed or other vehicle control information. The UI 8 outputs the input operation information to the navigation device 7 and the drive planning device 16, via the in-vehicle network 22.

The speed sensor 9 detects speed information representing the speed of the vehicle 10, and outputs it to the speed determination device 19 via the in-vehicle network 22. The speed sensor 9 detects the rotational speed of the tires of the vehicle 10, and outputs speed information representing the rotational speed to the speed determination device 19.

The map information storage device 11 stores wide-area map information for a relatively wide area (an area of 10 to 30 km$^2$, for example) that includes the current location of the vehicle 10. The wide-area map information preferably has high precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 6, the map information storage device 11 refers to the stored wide-area map information and outputs map information for a relatively narrow area including the current location represented by the positioning information (for example, an area of 100 m to 10 km$^2$), through the in-vehicle network 22 to the location estimating device 13, the traveling lane planning device 15 and the drive planning device 16.

The monitoring device 12 monitors the state of the driver, and when activity of the driver related to driving has not been detected, it generates a "non-active driving signal", indicating that activity of the driver relating to driving has not been detected. The monitoring device 12 outputs the non-active driving signal to the drive planning device 16 via the in-vehicle network 31. The monitoring device 12 comprises a surveillance camera 121 that photographs a head image that includes the head of the driver, a touch sensor 122 that detects when the driver is holding the steering wheel, and a torque sensor 123 that detects the torque of the steering wheel. Based on an image of the head photographed at a monitoring time with a predetermined cycle, the monitoring device 12 detects the driver's line-of-sight direction, the degree to which the eyes are open (hereunder also referred to as "degree of eye opening") and the degree to which the mouth is open (hereunder also referred to as "degree of mouth opening"), and determines the level of active operation by the driver, based on the detected line-of-sight direction, degree of eye opening and degree of mouth opening. When the line-of-sight direction is out of a predetermined range that includes the front of the vehicle 10, the monitoring device 12 determines that the level of active operation by the driver is low. When the degree of eye opening is less than a predetermined reference value for the degree of eye opening or the degree of mouth opening is greater than a predetermined reference value for the degree of mouth opening, the monitoring device 12 likewise determines that the level of active operation by the driver is low. On the other hand, when the line-of-sight direction is within a predetermined reference level range including the front of the vehicle 10, or the degree of eye opening is greater than a predetermined reference value for the degree of eye opening, or the degree of mouth opening is less than a predetermined reference value for the degree of mouth opening, the monitoring device 12 determines that the level of active operation by the driver is high.

When it has been determined that the level of active operation by the driver is low, the monitoring device 12 warns the driver through the UI 8 to recommend active operation of the vehicle. The monitoring device 12 also outputs a warning signal indicating that the driver has been warned, to the driver determination device 18 via the in-vehicle network 22. Determination by the monitoring device 12 that the level of active operation by the driver is low is an example of determination that the level of active operation by the driver is lower than the predetermined reference level. If, within a predetermined time after having alerted the driver, it has been determined that the level of active operation by the driver is high based on the detected line-of-sight direction, degree of eye opening and degree of mouth opening, the monitoring device 12 determines that the driver is actively operating the vehicle. If, within a predetermined time after having alerted the driver, the touch sensor 122 has detected that the driver is holding the steering wheel, or the torque sensor 123 has detected operation of the steering wheel by the driver, the monitoring device 12 determines that the driver is actively operating the vehicle. If, within a predetermined time after having alerted the driver, operation of the accelerator pedal or brake pedal by the driver has been detected, the monitoring device 12 likewise determines that the driver is actively operating the vehicle. On the other hand, when it has not been determined that the level of active operation by the driver is high, and the touch sensor 122 has not detected that the driver is holding the steering wheel, and the torque sensor 123 has not detected operation of the steering wheel by the driver, and operation of the accelerator pedal or brake pedal by the driver has not been detected, within a predetermined time after having alerted the driver, then it is determined that the driver is not actively operating the vehicle. The monitoring device 12 also generates a non-active driving signal indicating that activity related to operation by the driver has not been detected. Determination by the monitoring device 12 that the driver is not actively driving is an example of determination that the level of active operation by the driver is lower than the second predetermined reference level which is lower than the predetermined reference level. The monitoring device 12 outputs the non-active driving signal to the driver determination device 18 and drive planning device 16. This is only one example of generating a non-active driving signal, and the monitoring device 12 may use another method to determine whether or not a non-active driving signal is to be generated.

The location estimating device 13 estimates the location of the vehicle 10 at the camera image photograph time, based on the road features surrounding the vehicle 10 represented in the camera image. For example, the location estimating device 13 compares lane marking lines identified in the camera image with lane marking lines represented in the map information input from the map information storage device 11, and determines the estimated location and estimated declination of the vehicle 10 at the camera image photograph time. The location estimating device 13 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 13 outputs this information to the object detector 14, traveling lane planning device 15, drive planning device 16 and vehicle control device 17.

The object detector 14 detects other objects around the vehicle 10 and their types (for example, vehicles) based on the camera image and reflected wave information. Other objects also include other vehicles traveling around the vehicle 10. The object detector 14 tracks other detected objects and determines the trajectories of the other objects. In addition, the object detector 14 identifies the traveling lanes in which the other objects are traveling, based on the lane marking lines represented in the map information and the locations of the objects. The object detector 14 outputs object detection information which includes information representing the types of other objects that were detected, information indicating their locations, and also information indicating their traveling lanes, to the traveling lane planning device 15 and drive planning device 16.

At a traveling lane-planning creation time set in a predetermined cycle, the traveling lane planning device 15 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 15 creates a traveling lane plan for the vehicle 10 to travel on a traffic lane other than a overtaking lane. Each time a traveling lane plan is created, the traveling lane planning device 15 outputs the traveling lane plan to the drive planning device 16.

The traveling lane planning device 15 also determines whether or not a lane change is necessary within the nearest driving zone selected from the navigation route, based on the map information, the navigation route and the current location of the vehicle 10. The traveling lane planning device 15 may further utilize surrounding environment information or vehicle status information for determination of whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the traveling lane planning device 15 determines whether or not a lane change is necessary for moving to a traffic lane toward the destination location of the vehicle 10, based on the navigation route and the current location of the vehicle 10. Determination is made of whether or not the vehicle 10 is approaching another road that merges ahead from the traveling route on which it is currently traveling (merge), or the vehicle 10 is exiting onto another road branching out ahead from the traveling route (branch). Since merging and branching involve movement of the vehicle from a lane of the traveling route to a lane in another road, a lane change is carried out.

At a driving plan creation time set with a predetermined cycle, the drive planning device 16 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When the traveling lane plan includes a lane change wherein the vehicle 10 is to move between traffic lanes, the drive planning device 16 creates a driving plan that includes the lane change, in such a manner that a distance more than a predetermined distance can be maintained between the vehicle 10 and other vehicles. When the traveling lane plan includes a lane change wherein the vehicle 10 is to move between traffic lanes, but a distance more than the predetermined distance cannot be ensured between the vehicle 10 and another vehicle, the drive planning device 16 creates a driving plan for stopping the vehicle. The drive planning device 16 outputs a driving plan to the vehicle control device 17 for each driving plan created. In deceleration plan processing by the vehicle control system 1, when it has been determined that the level of active operation by the driver is lower than the predetermined reference level and the speed of the vehicle 10 is faster than the reference speed, the drive planning device 16 generates a first driving plan whereby the first deceleration is used to decelerate the vehicle 10 without activating the brake lights 5a, 5b. Also, in deceleration plan processing by the vehicle control system 1, when it has been determined that the level of active operation by the driver is lower than the predetermined reference level and the speed of the vehicle 10 is equal to or below the reference speed, the drive planning device 16 generates a second driving plan whereby a second deceleration that is greater than the first deceleration is used to decelerate the vehicle 10. Generation of the driving plan to decelerate the vehicle 10 by the drive planning device 16 will be described below, together with explanation of the deceleration plan processing by the vehicle control system 1.

The vehicle control device 17 controls each unit of the vehicle 10 based on the current location of the vehicle 10 and the vehicle speed and yaw rate, as well as on the driving plan generated by the drive planning device 16, so that the vehicle 10 travels along the navigation route. For example, the vehicle control device 17 determines the steering angle, acceleration and angular acceleration of the vehicle 10 according to the driving plan and the speed and yaw rate of the vehicle 10, and sets the amount of steering, and the accelerator or brake level, so as to match that steering angle, accelerator level and angular acceleration. The vehicle control device 17 also outputs a control signal corresponding to a set steering amount, to an actuator (not shown) that controls the steering wheel for the vehicle 10. The vehicle control device 17 also determines the amount of fuel injection according to a set accelerator level, and outputs a control signal corresponding to the amount of fuel injection to a drive unit (not shown) of the engine of the vehicle 10. Alternatively, the vehicle control device 17 may output a control signal corresponding to a set brake level to the brake (not shown) of the vehicle 10.

In deceleration plan processing by the vehicle control system 1, the driver determination device 18 determines the level of active operation by the driver, while the speed determination device 19 determines the relationship between the speed of the vehicle 10 and the predetermined reference speed.

The map information storage device 11, monitoring device 12, location estimating device 13, object detector 14, traveling lane planning device 15 and vehicle control device 17 comprise a communication interface (not shown), a memory (not shown) and a processor (not shown). The communication interface has an interface circuit to connect each device with the in-vehicle network 22. The drive planning device 16 has a communication interface 161, a memory 162 and a processor 163. The driver determination device 18 has a communication interface 181, a memory 182 and a processor 183. The speed determination device 19 has a communication interface 191, a memory 192 and a processor 193.

All of some of the functions of the map information storage device 11, monitoring device 12, location estimating device 13, object detector 14, traveling lane planning device 15, drive planning device 16, vehicle control device 17, driver determination device 18 and speed determination device 19 are, for example, functional modules realized by a computer program that is operated in a processor. Alternatively, the functional module of the processor may be a specialized computing circuit in the processor. The processor comprises one or more CPUs (Central Processing Units) and their peripheral circuits. The processor may also have other computing circuits such as a logical operation unit, numerical calculation unit or graphic processing unit. The memory of each device is an example of a memory unit, and it has a volatile semiconductor memory and a non-volatile semiconductor memory, for example. The memory stores an application computer program and various data to be used for information processing carried out by the processor of each device.

The map information storage device 11, monitoring device 12, location estimating device 13, object detector 14, traveling lane planning device 15, drive planning device 16, vehicle control device 17, driver determination device 18 and speed determination device 19 were explained above as separate devices, but all or some of them may be constructed in a single device.

The drive planning device 16, driver determination device 18 and speed determination device 19 cooperate to execute deceleration plan processing whereby, when it has been determined that the level of active operation by the driver is lower than the predetermined reference level, and the vehicle 10 is traveling at a relatively high speed, the speed of the vehicle 10 is caused to decelerate so as not to interfere with traveling of subsequent vehicles.

Figure 3:
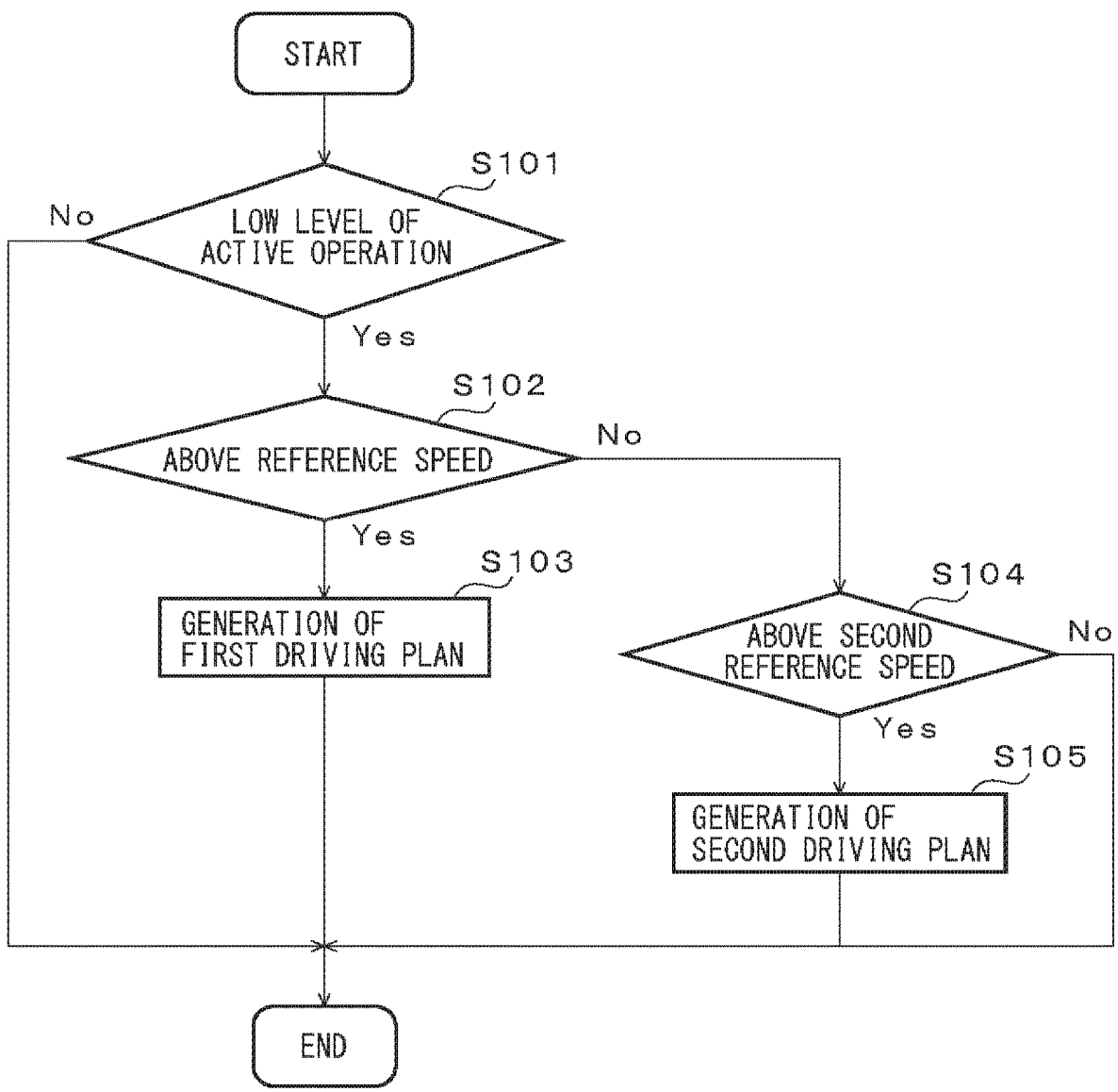
FIG. 3 is an operation flow chart for deceleration plan processing by a vehicle control system of the embodiment.

FIG. 3 is an example of an operation flow chart for deceleration plan processing by the vehicle control system 1. Processing by the vehicle control system 1 will be described below with reference to FIG. 3. The vehicle control system 1 repeatedly carries out deceleration plan processing according to the operation flow chart shown in FIG. 3, while the vehicle 10 is traveling.

First, the driver determination device 18 of the vehicle control system 1 determines whether or not the level of active operation by the driver is lower than the predetermined reference level at a driver determination time that is set with a predetermined cycle (step S101). When a warning signal or non-active driving signal has been input through the monitoring device 12, the driver determination device 18 determines that the level of active operation by the driver is lower than the predetermined reference level (step S101-Yes). When the line-of-sight direction of the driver is outside of the predetermined range that includes the front of the vehicle 10, or the degree of eye opening of the driver is less than the predetermined reference value for the degree of eye opening, or the degree of mouth opening of the driver is greater than the predetermined reference value for the degree of mouth opening, the monitoring device 12 outputs a warning signal to the driver determination device 18, so that when a warning signal is input, the driver determination device 18 determines that the level of active operation by the driver is lower than the predetermined reference level. Since the monitoring device 12 outputs a non-active driving signal to the driver determination device 18 when the level of active operation by the driver has not been determined to be high within the predetermined time after having alerted the driver, the driver determination device 18 determines that the level of active operation by the driver is lower than the predetermined reference level when a non-active driving signal has been input.

When a warning signal or non-active driving signal has not been input from the monitoring device 12, on the other hand, the driver determination device 18 determines that the level of active operation by the driver is not lower than the predetermined reference level (no problem) (step S101-No), and operation for deceleration plan processing by the vehicle control system 1 is complete.

When it has been determined that the level of active operation by the driver is lower than the predetermined reference level, the speed determination device 19 of the vehicle control system 1 determines the relationship between the speed of the vehicle 10 and the reference speed (step S102). First, the speed determination device 19 determines the speed of the vehicle 10 based on speed information input from the speed sensor 9. For example, the speed determination device 19 determines the speed of the vehicle 10 based on the rotational speed of the tires of the vehicle 10, as an example of speed information. The relationship between the region and the reference speed for the region are stored in a memory 192 of the speed determination device 19. The speed determination device 19 determines whether or not the speed of the vehicle 10 is lower than the reference speed, based on the reference speed for the region that includes the current location of the vehicle 10, read out from the memory 192. The speed determination device 19 notifies the drive planning device 16 of the determination results for the relationship between the speed of the vehicle 10 and the reference speed.

When the speed of the vehicle 10 is faster than the reference speed (step S102-Yes), the drive planning device 16 of the vehicle control system 1 generates a first driving plan whereby a first deceleration is used to decelerate the speed of the vehicle 10 without activating the brake lights 5a, 5b (step S103), while the vehicle control device 17 is also notified of the driving plan. The drive planning device 16 may generate the first driving plan so as to include the period in which the first deceleration is used to decelerate the vehicle 10, and a period in which it is not decelerating. The drive planning device 16 may also generate the first driving plan so that the first deceleration is changed during the first driving plan to another value within the range lower than the second deceleration. Operation relating to the deceleration plan processing by the vehicle control system 1 is thus complete.

On the other hand, when the speed of the vehicle 10 is equal to or below the reference speed (step S102-No), the drive planning device 16 determines whether or not the speed of the vehicle is faster than the second reference speed which is slower than the reference speed (step S104). When the speed of the vehicle 10 is faster than the second reference speed (step S104-Yes), the drive planning device 16 generates a second driving plan whereby the second deceleration that is greater than the first deceleration is used to decelerate the speed of the vehicle 10 (step S105). The drive planning device 16 may generate the second driving plan so as to include the period in which the second deceleration is used to decelerate the vehicle 10, and a period in which it is not decelerating. The drive planning device 16 may also generate the second driving plan so that the second deceleration is changed during the second driving plan to another value within a range higher than the first deceleration.

The drive planning device 16 may also generate the second driving plan so that when the speed of the vehicle is equal to or below the reference speed and a non-active driving signal is input from the monitoring device 12, the vehicle 10 is moved to the shoulder 53 adjacent to the traffic lane 51 in which the vehicle 10 is traveling, and stopped. Specifically, the drive planning device 16 sets a target location on the shoulder 53 where the vehicle 10 can be stopped within a predetermined range from the current location of the vehicle 10, based on the current location of the vehicle 10, the map information and the speed of the vehicle 10. In addition, the drive planning device 16 generates a second driving plan whereby, after decelerated movement from the current location of the vehicle 10 toward the target location on the shoulder 53 while the vehicle 10 activates the turn signal, the vehicle is stopped at the target location on the shoulder 53. The drive planning device 16 generates the second driving plan so that when the braking device is used, the brake lights 5a, 5b are activated and the emergency flash indicators 4a to 4f are turned off. The drive planning device 16 notifies the vehicle control device 17 of the second driving plan. Operation relating to the deceleration plan processing by the vehicle control system 1 is thus complete.

However, when the speed of the vehicle 10 is equal to or below the second reference speed (step S104-No), operation relating to deceleration plan processing by the vehicle control system 1 is complete. In this case, the drive planning device 16 may generate a driving plan for the vehicle 10 so that the vehicle 10 follows other vehicles traveling ahead of it.

Figure 4:
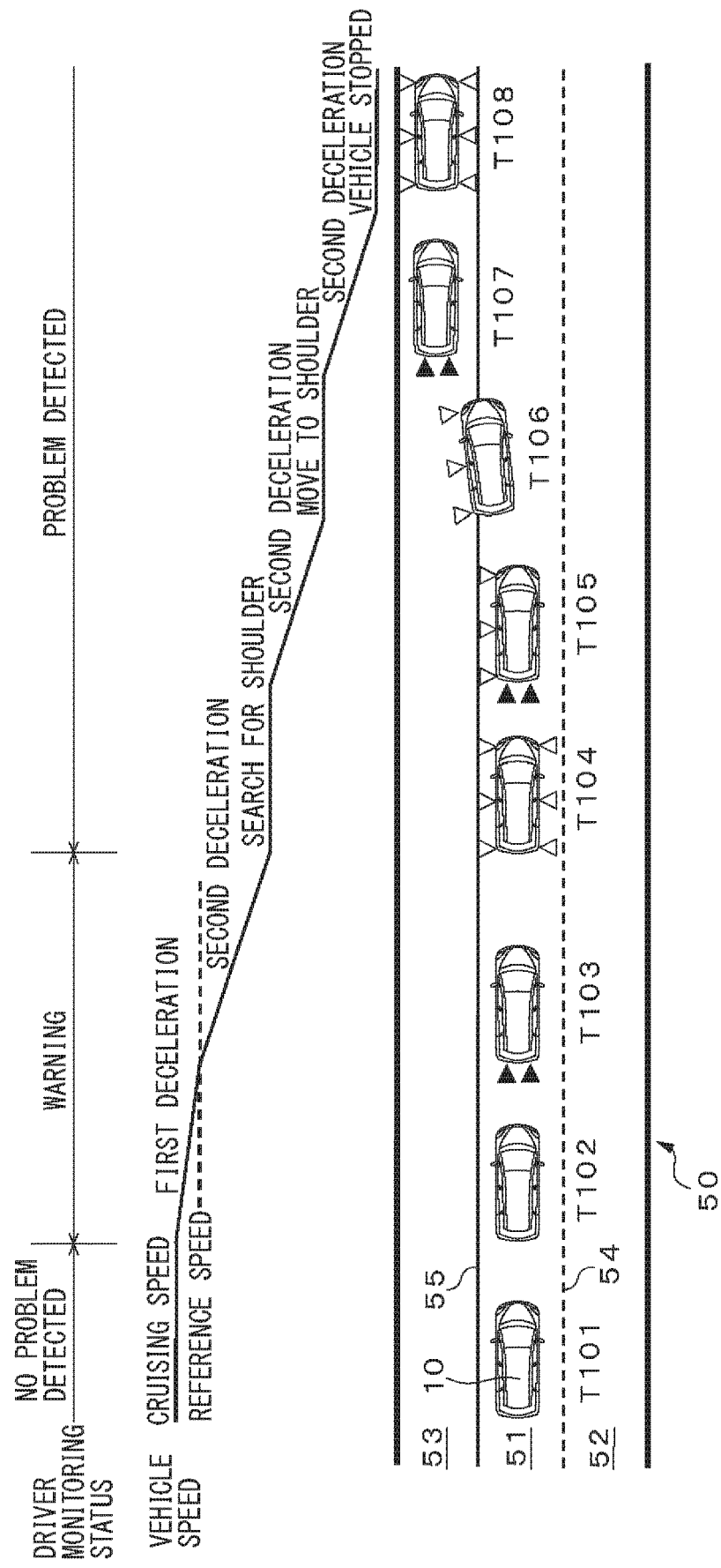
FIG. 4 is a diagram illustrating operation of a vehicle control system (1).

An example of operating the vehicle 10 that is controlled based on the driving plan described above will now be explained with reference to FIG. 4.

First, at time T101, the vehicle 10 travels at cruising speed on the traffic lane 51 of the road 50, and the driver determination device 18 determines that the level of active operation by the driver is equal to or above the predetermined reference level (no problem).

Next, at time T102, the vehicle 10 gives the driver a warning. The vehicle 10 determines that the level of active operation by the driver is lower than the predetermined reference level and the speed of the vehicle 10 is higher than the reference speed. The vehicle 10 travels on the traffic lane 51 while using the first deceleration to decelerate the speed of the vehicle 10 without activating the brake lights 5a, 5b. As the means for achieving the first deceleration, the vehicle 10 may use an engine brake (when the drive unit has an internal combustion engine), a regenerative brake (when the drive unit has an electric motor), or air resistance of the vehicle 10 and friction between the tire and road surface. Since the amount of reduction in speed of the vehicle 10 is on the level of the standard deviation of distribution in the speed of the vehicle traveling on the road 50, it is within the range of variation in the speed of vehicles traveling on the road 50. It is therefore assumed that the reduction in the speed of the vehicle 10 by the first deceleration will not interfere with traveling of subsequent vehicles located behind the vehicle 10.

At time T103, the vehicle 10 determines that the level of active operation by the driver is lower than the predetermined reference level and the speed of the vehicle 10 is equal to or below the reference speed. The vehicle 10 uses the second deceleration to cause the vehicle 10 to travel on the traffic lane 51 while decelerating. As the means for achieving the second deceleration, the vehicle 10 may use a braking device that reduces the rotational speed of the tires by frictional force, and a regenerative brake (when the vehicle 10 has an electric motor as the drive unit). In the example shown in FIG. 4, the vehicle 10 uses a braking device for deceleration, and it therefore travels on the traffic lane 51 while the brake lights 5a, 5b are activated.

Next, at time T104, the vehicle 10 determines that the driver is not actively driving. The vehicle 10 activates the emergency flash indicators 4a to 4f while maintaining a constant speed, and travels on the traffic lane 51 while searching for a target location on the shoulder 53 where the vehicle 10 can stop, within a predetermined range from the current location of the vehicle 10.

Next, at time T105, the vehicle 10 activates the turn signals 4a to 4c indicating that the vehicle 10 will change direction to the left while traveling on the traffic lane 51, in order to move to the target location on the shoulder 53. Since the vehicle 10 uses the braking device to decelerate to reach the second deceleration, the brake lights 5a, 5b are activated and the emergency flash indicators 4a to 4f are turned off. Alternatively, the vehicle 10 may activate the brake lights 5a, 5b and turn off the turn signals 4a to 4c.

Since the brake lights 5a, 5b serve to notify drivers of subsequent vehicles that the vehicle 10 is decelerating while the emergency flash indicators 4a to 4f serve to notify drivers of other surrounding vehicles that the vehicle 10 is in an emergency state, both lights attract attention to the vehicle that has activated them. When the two lights are activated simultaneously, drivers of subsequent vehicles and other surrounding vehicles may not be able to accurately ascertain the state of the vehicle that activated the lamps. The vehicle 10 therefore controls only either the brake lights 5a, 5b or the emergency flash indicators 4a to 4f to be activated, so that drivers of subsequent vehicles or other surrounding vehicles are not confused. Depending on the region, drivers of other vehicles may not become confused when two lights are activated. In such cases, the vehicle 10 may activate the brake lights 5a, 5b, while flashing the emergency flash indicators 4a to 4f. Alternatively, the vehicle 10 may activate the brake lights 5a, 5b and also activate the turn signals 4a to 4c.

Next, at time T106, the vehicle 10 activates the turn signals 4a to 4c, and enters the shoulder 53 from the traffic lane 51 in which it was traveling, across the lane marking line 55. Since the turn signal and emergency flash indicator are the same, the emergency flash indicator is turned off during activation of the turn signal.

Next, at time T107, the vehicle 10 uses the braking device to decelerate, and therefore the vehicle 10 activates the brake lights 5a, 5b and turns off the emergency flash indicators 4a to 4f.

Next, at time T108, the vehicle 10 stops at the target location on the shoulder 53, halts operation of the braking device and activates the emergency flash indicators 4a to 4f.

Figure 5:
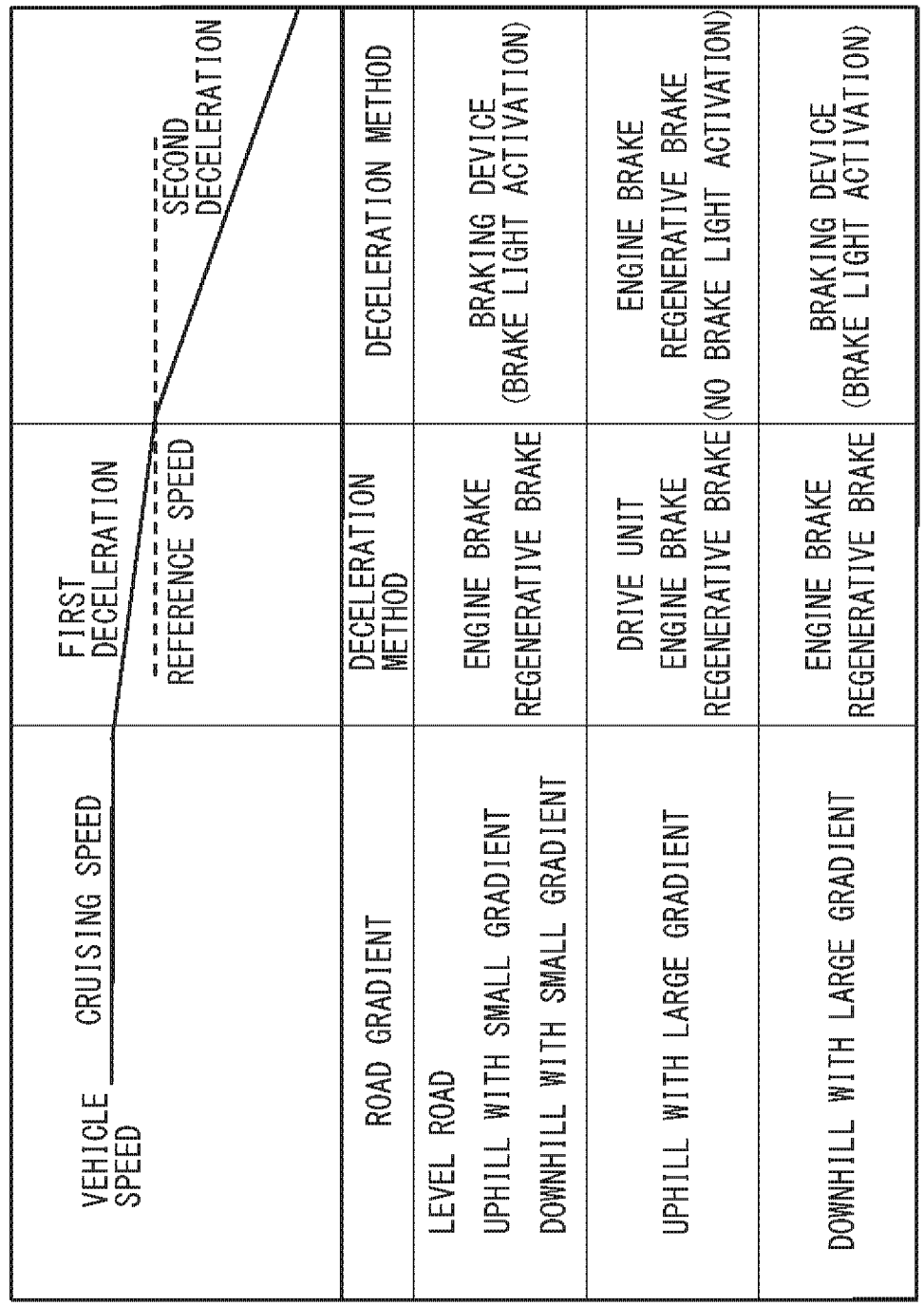
FIG. 5 is a diagram illustrating operation of a vehicle control system (2).

As mentioned above, the vehicle control device 17 of the vehicle 10 decelerates the vehicle 10 with the first deceleration or second deceleration, based on the driving plan generated by the drive planning device 16. A specific example of a method of decelerating the vehicle 10 by the vehicle control device 17 will now be explained with reference to FIG. 5.

Since deceleration of the vehicle 10 will often be greatly affected by the gradient of the road on which the vehicle 10 is traveling, FIG. 6 shows a deceleration method for the first deceleration and a deceleration method for the second deceleration that depend on the gradient of the road.

(Deceleration Method for First Deceleration)

First, when the vehicle 10 traveling on a level road with a relatively small road gradient, or uphill with a small gradient or downhill with a small gradient, the vehicle control device 17 either stops supply of fuel to the drive unit and uses the engine brake, or uses regenerative braking with the rotary force of the tires for electric motor power generation, as the method for achieving the first deceleration. When deceleration of the vehicle 10 does not reach the first deceleration, the vehicle control device 17 may further increase deceleration by gear downshifting. Alternatively, the method of achieving the first deceleration (and second deceleration) may be air resistance of the vehicle 10 and friction between the tires and road surface, which however is not a method of braking that is controllable by the vehicle control device 17.

When an uphill road on which the vehicle 10 is traveling has a large gradient, the vehicle control device 17 first uses engine braking or regenerative braking as the method of achieving the first deceleration. If the vehicle 10 is decelerated by the large slope of the road so that deceleration of the vehicle 10 increases beyond the first deceleration, then the vehicle control device 17 accelerates the vehicle 10 using the drive unit, controlling the vehicle 10 so that deceleration of the vehicle 10 reaches the first deceleration. The method of achieving the first deceleration (and second deceleration) may also be air resistance of the vehicle 10 and friction between the tires and road surface, which however is not a method of braking that is controllable by the vehicle control device 17.

When a downhill road on which the vehicle 10 is traveling has a large gradient, the vehicle control device 17 uses engine braking or regenerative braking as the method of achieving the first deceleration. Alternatively, the method of achieving the first deceleration (and second deceleration) may be air resistance of the vehicle 10 and friction between the tires and road surface, which however is not a method of braking that is controllable by the vehicle control device 17. When the level of active operation by the driver is lower than the predetermined reference level and a state where the speed of the vehicle 10 is faster than the reference speed continues for longer than a predetermined time, the drive planning device 16 may generate a second driving plan. The vehicle control device 17 controls the vehicle 10 so that the first deceleration is reached even when the vehicle 10 is traveling on an uphill road with a small gradient or large gradient, or a downhill road with a small gradient or large gradient.

(Deceleration Method for Second Deceleration)

First, when the vehicle 10 is traveling on a level road with a relatively small road gradient, uphill with a small gradient or downhill with a small gradient, the vehicle control device 17 uses the braking device as the method of achieving the second deceleration. The vehicle control device 17 activates the brake lights 5a, 5b while the braking device is being operated. The vehicle control device 17 may also use regenerative braking.

When an uphill road on which the vehicle 10 is traveling has a large gradient, the vehicle control device 17 then uses engine braking or regenerative braking as the method of achieving the second deceleration. When deceleration of the vehicle 10 does not reach the second deceleration, the vehicle control device 17 may further increase deceleration by gear downshifting. Alternatively, the method of achieving the second deceleration may be air resistance of the vehicle 10 and friction between the tires and road surface, which however is not a controllable method of braking. The vehicle control device 17 may also use a braking device.

When a downhill road on which the vehicle 10 is traveling has a large gradient, the vehicle control device 17 uses a braking device as the method of achieving the second deceleration. The vehicle control device 17 activates the brake lights 5a, 5b while the braking device is being operated. The vehicle control device 17 may also use regenerative braking. The vehicle control device 17 controls the vehicle 10 so that the second deceleration is reached even when the vehicle 10 is traveling on an uphill road with a small gradient or large gradient, or a downhill road with a small gradient or large gradient.

As explained above, the vehicle control device determines the level of active operation by the driver and determines the relationship between the speed of the vehicle and a predetermined reference speed. When it has been determined that the level of active operation by the driver is lower than a predetermined reference level and the speed of the vehicle is faster than the reference speed, the vehicle control device generates a first driving plan whereby the first deceleration is used to decelerate the speed of the vehicle without activating the brake light, and when it has been determined that the level of active operation by the driver is lower than the predetermined reference level and the speed of the vehicle is equal to or below the reference speed, it generates a second driving plan whereby a second deceleration that is greater than the first deceleration is used to decelerate the speed of the vehicle. When it has been determined that the level of active operation by the driver is low, therefore, and when the vehicle is traveling at a relatively high speed, the vehicle control device can decelerate the vehicle without activating the brake light until the speed of the vehicle has fallen below the predetermined reference speed, so as not to interfere with traveling of subsequent vehicles.

Another example of operation relating to deceleration plan processing by the vehicle control system 1 will now be described with reference to FIG. 6.

In the example of operation relating to deceleration plan processing by the vehicle control system 1 described above, the vehicle 10 stopped the vehicle on the shoulder adjacent to the traffic lane 51 in which it was traveling, but depending on the terrain it may not be possible to find a shoulder where the vehicle 10 can be stopped. In this case, the vehicle 10 is stopped on the traffic lane in which it is traveling. An operation example in which the vehicle 10 stops on the traffic lane in which it is traveling will now be explained with reference to FIG. 6.

In the example shown in FIG. 6, operation of the vehicle 10 from time T201 to time T203 is the same as operation from time T101 to time T103 in the operation example described above. At time T204, the vehicle 10 searched for, but could not find, a target location on the shoulder 53 where the vehicle 10 could stop within a predetermined range from the current location of the vehicle 10. The vehicle 10 therefore sets a target location on the traffic lane 51 for deceleration at the second deceleration and stopping.

Next, at time T204, the vehicle 10 travels on the traffic lane 51 while flashing the emergency flash indicators 4a to 4f, maintaining a constant speed. Next, at time T205, the vehicle 10 uses the braking device to decelerate, and therefore activates the brake lights 5a, 5b and turns off the emergency flash indicators 4a to 4f. Next, at time T206, the vehicle 10 stops at the target location on the traffic lane 51, halts operation of the braking device and activates the emergency flash indicators 4a to 4f.

The vehicle control device and computer program for vehicle control and method for controlling vehicle according to the embodiment described above may incorporate appropriate modifications that are still within the gist of the invention. Moreover, the technical scope of the invention is not limited to this embodiment, and includes the invention and its equivalents as laid out in the Claims.

For example, in the embodiment described above, the drive planning device generated a driving plan for deceleration of the vehicle 10 when a warning signal was input from the monitoring device, but the drive planning device may instead generate a driving plan for deceleration of the vehicle 10 only after a non-active driving signal has been input from the monitoring device.

The invention claimed is:

1. A vehicle control device comprising a processor that is configured to:
   determine a level of active operation by a driver based on a line-of sight of the driver's eyes, an eye opening degree of the driver, a mouth opening degree of the driver, a steering wheel touch sensor signal and a steering wheel torque sensor signal;
   determine a relationship between a speed of the vehicle and a predetermined reference speed; and,
   generate a first driving plan whereby a first deceleration is used to decelerate the vehicle without activating a brake light when it has been determined that the level of active operation by the driver is lower than a predetermined reference level and the speed of the vehicle is faster than the reference speed, and generate a second driving plan whereby a second deceleration that is greater than the first deceleration is used to decelerate the vehicle, and activating the brake light, when it has been determined that the level of active operation by the driver is lower than the predetermined reference level and the speed of the vehicle is equal to or below the reference speed;

wherein:

the processor is also configured to control operation of the vehicle based on the first driving plan while the vehicle speed is above the reference speed and based on the second driving plan while the vehicle speed is equal to or below the reference speed.

2. The vehicle control device according to claim 1, wherein the processor is configured to generate a second driving plan so that an emergency flash indicator flashes when it has been determined that the level of active operation by the driver is lower than a second predetermined reference level which is lower than the predetermined reference level and the speed of the vehicle is equal to or below the reference speed, and the brake light activates and the emergency flash indicator turns off when it has been determined that the level of active operation by the driver is lower than the second predetermined reference level and a braking device is being used.

3. A computer-readable non-transitory storage medium that stores a computer program for vehicle control, which causes a processor to:

determine a level of active operation by a driver based on a line-of sight of the driver's eyes, an eye opening degree of the driver, a mouth opening degree of the driver, a steering wheel touch sensor signal and a steering wheel torque sensor signal;

determine a relationship between a speed of the vehicle and a predetermined reference speed; and, generate a first driving plan whereby a first deceleration is used to decelerate the vehicle without activating a brake light when it has been determined that the level of active operation by the driver is lower than a predetermined reference level and the speed of the vehicle is faster than the reference speed, and generate a second driving plan whereby a second deceleration that is greater than the first deceleration is used to decelerate the vehicle, and activating the brake light, when it has been determined that the level of active operation by the driver is lower than the predetermined reference level and the speed of the vehicle is equal to or below the reference speed;

wherein:

the processor is also configured to control operation of the vehicle based on the first driving plan while the vehicle speed is above the reference speed and based on the second driving plan while the vehicle speed is equal to or below the reference speed.

4. A method for controlling a vehicle, wherein a vehicle control device:

determines a level of active operation by a driver based on a line-of sight of the driver's eyes, an eye opening degree of the driver, a mouth opening degree of the driver, a steering wheel touch sensor signal and a steering wheel torque sensor signal;

determines a relationship between a speed of the vehicle and a predetermined reference speed; and, generates a first driving plan whereby a first deceleration is used to decelerate the vehicle without activating a brake light when it has been determined that the level of active operation by the driver is lower than a predetermined reference level and the speed of the vehicle is faster than the reference speed, and generates a second driving plan whereby a second deceleration that is greater than the first deceleration is used to decelerate the vehicle, and activating the brake light, when it has been determined that the level of active operation by the driver is lower than the predetermined reference level and the speed of the vehicle is equal to or below the reference speed;

wherein:

the processor is also configured to control operation of the vehicle based on the first driving plan while the vehicle speed is above the reference speed and based on the second driving plan while the vehicle speed is equal to or below the reference speed.

* * * * *